(12) United States Patent
Endo

(10) Patent No.: US 6,771,465 B2
(45) Date of Patent: Aug. 3, 2004

(54) SMALL MAGNETIC DISK CARTRIDGE

(75) Inventor: Yasushi Endo, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/317,073

(22) Filed: Dec. 12, 2002

(65) Prior Publication Data
US 2003/0112559 A1 Jun. 19, 2003

(30) Foreign Application Priority Data
Dec. 14, 2001 (JP) ........................................ 2001-380906

(51) Int. Cl.[7] ............................................. G11B 23/03
(52) U.S. Cl. ..................................................... 360/133
(58) Field of Search ........................................ 360/133

(56) References Cited

U.S. PATENT DOCUMENTS
4,641,209 A * 2/1987 Smith, II .................... 360/133

OTHER PUBLICATIONS
U.S. patent application Ser. No. 10/266,584 (Q72293 filed Oct. 9, 2002).

* cited by examiner

Primary Examiner—Robert S. Tupper
(74) Attorney, Agent, or Firm—Sughrue Mion, PLLC

(57) ABSTRACT

A small magnetic disk cartridge comprising a housing, a rotatably disk-mounting hub, and a magnetic disk mounted on the disk-mounting hub. The disk-mounting hub is rotatably supported by the housing through a bearing equipped with inner and outer races that are mutually rotatable.

3 Claims, 2 Drawing Sheets

SMALL MAGNETIC DISK CARTRIDGE

BACKGROUND OF THE INVENTION

1. Field of the Invention

The present invention relates to a small magnetic disk cartridge that can be exchangeably loaded in a card disk drive that is inserted in the card slot of electronic equipment such as a digital still camera, a digital video camera, a laptop personal computer, etc.

2. Description of the Related Art

To record or reproduce information, a wide variety of recording media are removably loaded in the card slot of electronic equipment such as a digital still camera, a digital video camera, a laptop personal computer (PC), etc. Such recording media that are in practical use are a semiconductor memory type, a hard disk type, an optical disk type, a magnetic disk type (e.g., a floppy disk type), etc.

Among these recording media, the semiconductor memory type is most widely used, because it is easy to handle and has a relatively large recording capacity. However, the semiconductor memory type is relatively expensive. Therefore, in digital cameras employing the semiconductor memory type, the semiconductor memory is repeatedly used by storing the photographed image data in a PC, etc., and then deleting the data from the semiconductor memory.

Although some known hard disks can store 340 megabytes (MB) of data or 1 gigabytes (GB) of data, the hard disk type is similarly expensive. Likewise, the hard disk type is repeatedly used by storing data in a PC, etc., then deleting the data from the hard disk type memory.

The optical disk type has a large recording capacity for its size. For example, an optical disk with a size of 35 mm×41 mm×11 mm can store 256 MB of data. Optical disks with a recording capacity of 512 MB are about to be realized. However, optical disks have the disadvantage that the recording speed is slow, because the writing of data thereto is time-consuming.

Small magnetic disks (e.g., floppy disks) with a size of about 50 mm×55 mm×2 mm can be exchangeably loaded in a disk drive of a size that can be inserted in the card slot of a PC, etc. However, the recording capacity is as small as 40 MB and insufficient to store data photographed by a camera. In addition, the size is not suitable for digital cameras.

With the spread of PCs, digital cameras have spread rapidly in recent years because of the easy method of recording, enhancement of the picture quality due to the development of imaging devices, enablement of data deletion and transmission, size of the recording capacity, etc. However, digital cameras are restricted in use, because recording media are restricted in cost and recording capacity, as described above. For instance, since recording media are very expensive, one camera is usually provided with one recording medium, which is repeatedly used. That is, when the recording medium is filled with data, the data is transferred to a PC and deleted from the recording medium. Because of this, there are cases where the recording medium is filled up during a trip. In addition, the recording medium cannot be stored as is, with data stored therein, nor can it be given away to a person.

Hence, there is a demand for the realization of a small recording medium which is large in recording capacity and low in cost so that the data photographed by a digital camera can be stored as is, or given away to a person. In PCs, there is also a demand for the realization of an inexpensive small large-capacity recording medium that can be handed to a person.

To meet the aforementioned demands, it is contemplated that the above-described small recording medium may comprise a card disk drive which is loaded in electronic equipment such as a PC and a digital camera, and a magnetic disk cartridge which is loaded in the card disk drive. That is, it is contemplated that such a magnetic disk cartridge may comprise a housing with a sliding shutter, and a flexible magnetic disk, rotatably supported within the housing, which is capable of high-density recording and has a recording capacity of 200 MB or larger. Examples of magnetic recording media with a high recording density are a magnetic recording medium with a thin metal film formed by vapor deposition or sputtering, and a magnetic recording medium employing barium ferrite powder or ferromagnetic magnetic powder. The magnetic recording medium with a high recording density employing barium ferrite powder is disclosed, for example, in U.S. patent application Ser. No. 10/266,584.

The "magnetic recording medium with a high recording density employing barium ferrite powder" refers to a magnetic disk containing barium ferrite powder in a magnetic layer, and is formed from a material that is capable of a high recording density. The magnetic disk may be constructed of a magnetic recording medium. The disclosed magnetic recording medium has a non-magnetic substrate, a non-magnetic layer which contains both non-magnetic powder and a binder, and a magnetic layer which contains both ferromagnetic powder (which is hexagonal ferrite powder) and a binder. The non-magnetic layer and the magnetic layer are formed on at least one surface of the non-magnetic substrate in the recited order. In the non-magnetic layer, the quantity of carbon black whose average particle diameter is 10 to 30 nm is in a range of 10 to 50 weight parts with respect to 100 weight parts of the aforementioned non-magnetic powder. The thickness of the magnetic layer is 0.2 $\mu$m or less. According to an electron-beam microanalysis, the standard deviation (b) of the strength of an element with respect to an average strength (a) which results from ferromagnetic powder is in a range of $0.03 \leq b/a \leq 0.4$. The center plane average height Ra of the magnetic layer is 5 nm or less, and the 10-point average height Rz is 40 nm or less. In a magnetic disk employing the above-described magnetic recording medium, information is recorded or reproduced by employing a magnetic head, such as an MR head, a GMR head, and a TMR head, which is capable of a high recording density.

For instance, when the above-described magnetic recording medium is about 30 mm in diameter, it can have a high recording density of 200 MB or larger, preferably 500 MB or larger. Therefore, in the case of a still image having about 1 MB of data per image, the magnetic recording medium can store 500 images. In the case of a moving image, the magnetic recording medium can store image contents of about 30 minutes. Thus, the magnetic recording medium can store a moving image photographed by a digital camera, and a moving image which is transmitted by a portable telephone. As a result, users can conveniently use the magnetic recording medium. Furthermore, the magnetic recording medium can be conveniently used in PCs as an inexpensive large-capacity data storage medium. Thus, the convenience of the magnetic recording medium is great.

As previously described, card disk drives are loaded in electronic equipment such as a PC, a digital camera, etc. In the case of a PC shown in FIG. 1A, for instance, a card disk drive 6 is connected electrically with the socket 4 of the receiving portion of a card 2 that is inserted in the card slot of the PC. In the case of a digital camera 3 shown in FIG. 1B, a card disk drive 6 is connected electrically with the socket of the receiving portion 5 of the camera 3. In these card disk drives 6, a small magnetic disk cartridge 8 is removably loaded.

Therefore, the above-described card disk drive 6 is extremely small in size and has, for example, a length of 38 to 55 mm, a width of 35 to 51 mm, and a thickness of 3 to 5 mm. The above-described magnetic disk cartridge 8 has, for example, a length and a width of 25 to 36 mm and a thickness of 1 to 3 mm. This magnetic disk cartridge 8 is used to rotatably support a flexible magnetic disk (indicated by a hidden line in FIG. 1) within its housing.

In conventional magnetic disks with a high recording density, incidentally, the degradation of recording-reproduction characteristics due to fluctuations in the spacing between a magnetic disk and a magnetic head has become a problem. In addition, along with the narrowing of data tracks, slight circumferential fluctuations have also become problems as a cause of the degradation of recording-reproduction characteristics.

In addition, with a reduction in the width of a data track, the size of recorded signals is reduced. As a result, a dropout is caused by small dust particles which had been negligible in conventional magnetic disks.

Furthermore, with a reduction in size of magnetic disks, vertical alignment must be made with a high degree of accuracy when the magnetic disk cartridge 8 is loaded in the disk drive 6. That is, vertical alignment is usually made at two or three points, but since the distance between the points becomes short, both the disk drive 6 and the magnetic disk cartridge 8 require high accuracy.

A conventional small magnetic disk cartridge has, for instance, a structure such as that shown in FIG. 4. In this structure, a flexible magnetic disk 14 is rotatably supported within a flat housing 12. The housing 12 is constructed of an upper shell 12a and a lower shell 12b. The center portion of the magnetic disk 12 is mounted on a disk-mounting hub 15, which is spun by a spindle S provided in the above-described disk drive 6. The lower shell 12 is provided with a spindle hole 16 through which the disk-mounting hub 15 is magnetically chucked by the above-described spindle S. Note in all drawings that the thickness, etc., of each part are shown at ratios differing from actual dimensions to facilitate the understanding of the structure.

The disk-mounting hub 15 has a shaft portion 15a, which is chucked by the spindles of the disk drive 6. The hub 15 further has an annular portion 15b which is inserted into the center hole of the magnetic disk 14, and a flange portion 15c on which the radially inner circumferential portion of the magnetic disk 14 is mounted. Although not shown, liners and sliding sheets, etc., are interposed between the upper shell 12a and the upper side of the magnetic disk 14 and between the lower shell 12b and the under side of the magnetic disk 14. However, the conventional magnetic disk cartridge 8' has the disadvantage that dust is liable to enter the housing 12 through the spindle hole 16. In the conventional magnetic disk cartridge 8', the disk-mounting hub 15 is vertically movable with respect to the housing 12. When the magnetic disk cartridge 8' is loaded in the disk drive 6, the housing 12 and disk-mounting hub 15 are vertically positioned separately from each other. Because of this, there is a possibility that the housing 12 and disk-mounting hub 15 will tilt individually. In such a case, there is a problem that stable rotation of the magnetic disk 14 cannot be obtained.

SUMMARY OF THE INVENTION

The present invention has been made in view of the above-described circumstances. Accordingly, it is the primary object of the present invention to provide a small magnetic disk cartridge which is thin in thickness and large in recording capacity, and which is capable of preventing dust from entering the housing and obtaining stable rotation.

To achieve this end and in accordance with the present invention, there is provided a small magnetic disk cartridge for use in a card disk drive to be loaded in electronic equipment. The magnetic disk cartridge includes a housing, a disk-mounting hub which is rotated by a spindle provided in the disk drive, and a flexible magnetic disk mounted on the disk-mounting hub. The disk-mounting hub is rotatably supported by the housing through a bearing equipped with inner and outer races which are mutually rotatable.

The outer race may be fixed to the housing, while the inner race may be fixed to the disk-mounting hub. Conversely, the inner race may be fixed to the housing, and the outer race may be fixed to the disk-mounting hub.

According to the magnetic disk cartridge of the present invention, the disk-mounting hub is rotatably supported by the housing through the ball bearing equipped with inner and outer races which are mutually rotatable. Therefore, the center hole of the housing is closed with the disk-mounting hub and the bearing. As a result, the entry of dust into the housing can be prevented.

The disk-mounting hub is integrated with the bearing fixed to the housing. Therefore, when the magnetic disk is loaded in the disk drive, the magnetic disk can be vertically positioned with a high degree of accuracy. In the case where the housing tilts, the magnetic disk also tilts simultaneously and therefore the interior space of the housing does not change. As a result, stable rotation of the magnetic disk is obtained and makes it possible to assure a stable head touch.

Since the bearing and the disk-mounting hub are integrated with each other, the magnetic disk can be prevented from touching the liners or sliding sheets during conveyance.

BRIEF DESCRIPTION OF THE DRAWINGS

The present invention will be described in further detail with reference to the accompanying drawings wherein.

DESCRIPTION OF THE PREFERRED EMBODIMENTS

Figure 1A:
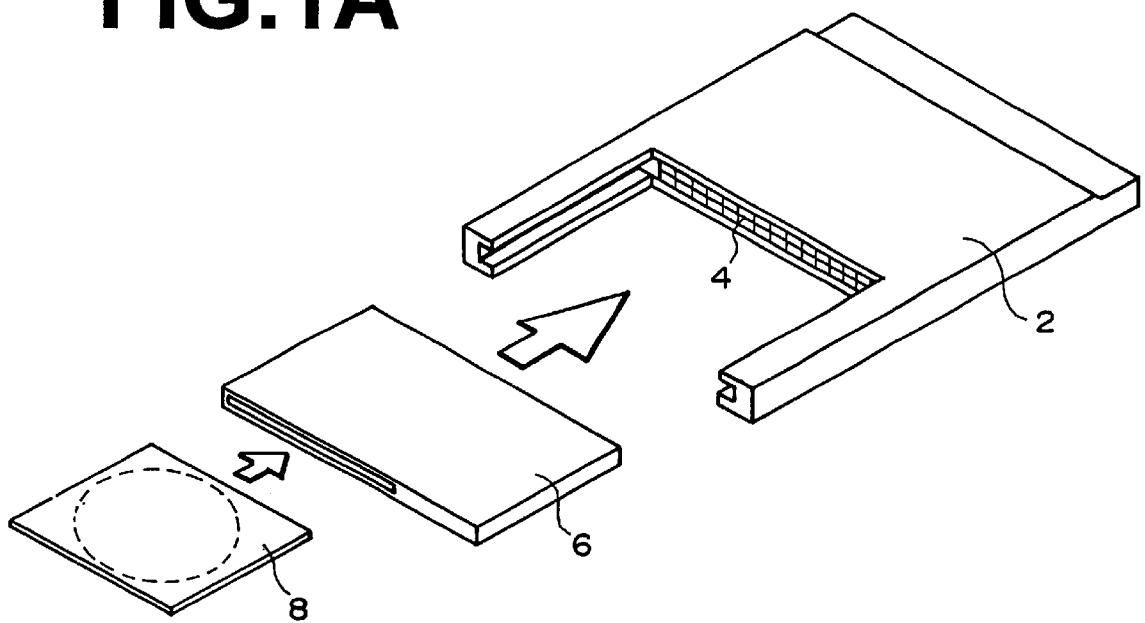
FIGS. 1A and 1B are diagrams used to explain how a magnetic disk cartridge is loaded in electronic equipment.
Figure 1B:
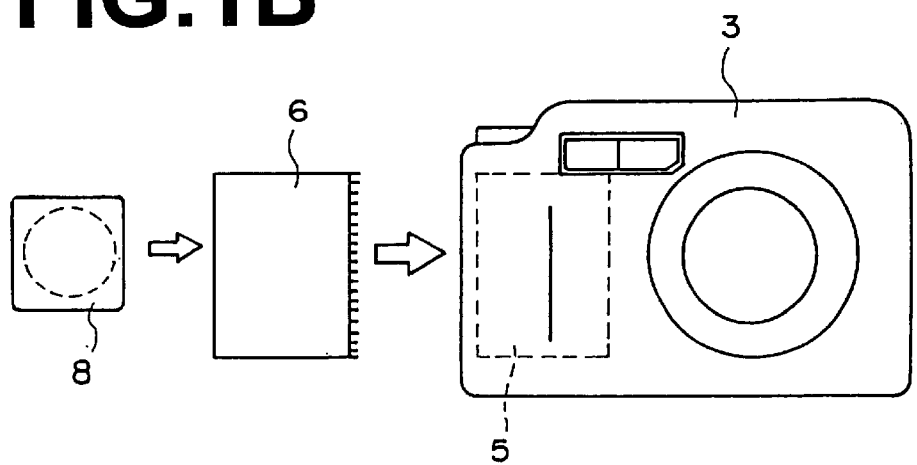
Figure 2:
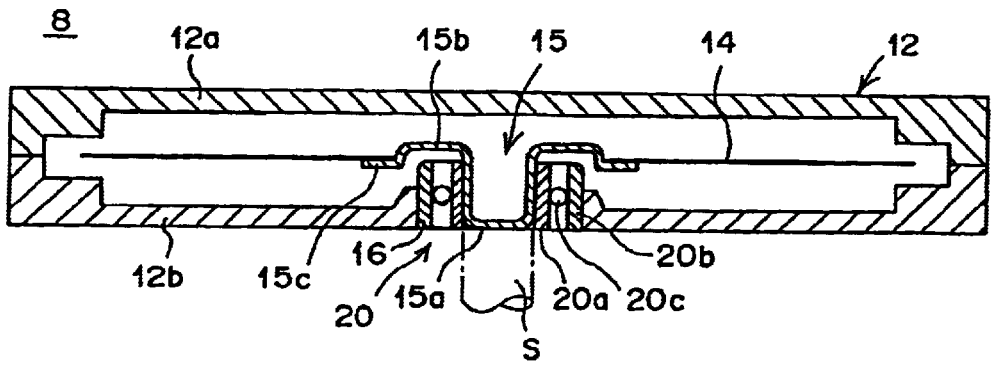
FIG. 2 is a sectional view showing a small magnetic disk cartridge constructed in accordance with a first embodiment of the present invention.

Referring now to FIG. 2, there is shown a small magnetic disk cartridge 8 constructed in accordance with a first embodiment of the present invention. The magnetic disk cartridge 8 has a flat housing 12 in which a magnetic disk 14 is rotatably supported. This magnetic disk 14 is constructed of a material that has a recording capacity of 200 MB or larger. For example, the magnetic disk 14 is constructed of the above-described magnetic recording medium that has a magnetic layer with a high recording density containing barium ferrite powder.

A disk-mounting hub 15 has a shaft portion 15a, which is chucked by the spindle S of the disk drive 6 by magnetic attraction, for example. The hub 15 further has an annular portion 15b which is inserted into the center hole of the magnetic disk 14, and a flange portion 15c on which the radially inner circumferential portion of the magnetic disk 14 is mounted. Although not shown, liners and sliding sheets, etc., are interposed between the upper shell 12a and the upper side of the magnetic disk 14 and between the lower shell 12b and the under side of the magnetic disk 14.

The central portion of the lower shell 12b of the housing is provided with a hole 16 into which a ball bearing 20 is inserted. The ball bearing 20 includes an inner race 20a, an outer race 20b, and a plurality of balls 20c interposed between the inner race 20a and the outer race 20b. The axial portion 15a of the disk-mounting hub 15 is fitted in the center hole of the ball bearing 20, and is fixed to the inner race 20a so that the bottom surface of the axial portion 15a of the disk-mounting hub 15 becomes coplanar with the bottom surface of the lower shell 12b. The outer race 20b of the ball bearing 20 is inserted into the center hole 16 of the lower shell 12b and fixed to the lower shell 12b. In this way, the disk-mounting hub 15 is rotatably supported by the lower shell 12b through the ball bearing 20.

Figure 3:
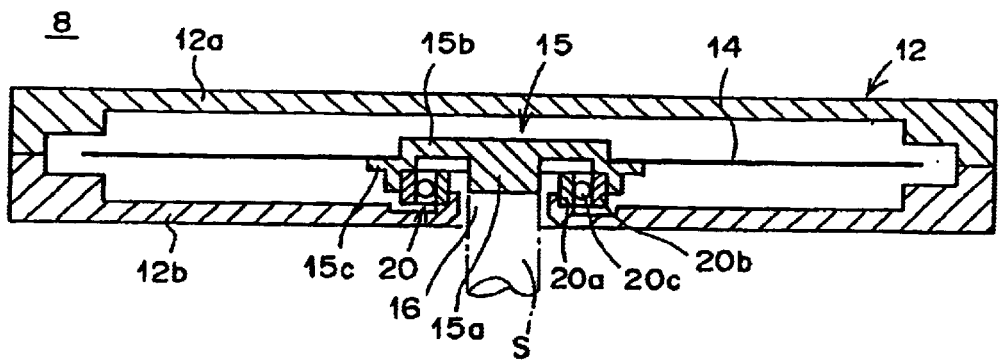
FIG. 3 is a sectional view showing a small magnetic disk cartridge constructed in accordance with a second embodiment of the present invention.
Figure 4:
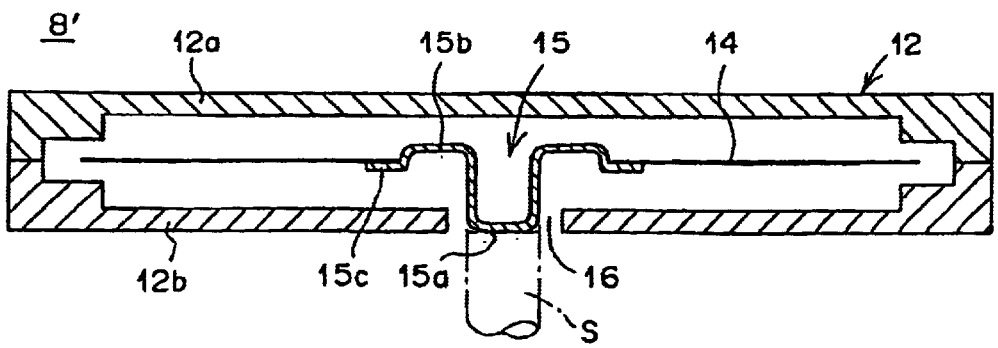
FIG. 4 is a sectional view showing a conventional magnetic disk cartridge.

Referring now to FIG. 3, there is shown a small magnetic disk cartridge 8 constructed in accordance with a second embodiment of the present invention. Note in FIG. 3 that the same parts as the first embodiment of FIG. 2 are represented by the same reference numerals; therefore, redundant explanations thereof have been omitted. The second embodiment is the same as the first embodiment of FIG. 2, except that (1) a disk-mounting hub 15 is mounted on the outer race 20b of a ball bearing 20 and (2) the inner race 20a is fixed to the radially inner circumferential portion of a lower shell 12b.

As evident in the foregoing description, the magnetic disk cartridge 8 of the present invention has the following advantages:

(1) The disk-mounting hub 15 is rotatably supported by the housing 12 through the ball bearing 20 equipped with inner and outer races 20a and 20b which are mutually rotatable. Therefore, the center hole 16 is closed with the disk-mounting hub 15 and the bearing 20. As a result, the entry of dust into the housing 12 can be prevented.

(2) The disk-mounting hub 15 is integrated with the bearing 20 fixed to the housing 12. Therefore, when the magnetic disk 14 is loaded in the disk drive 6, the magnetic disk 14 can be vertically positioned with a high degree of accuracy. In the case where the housing 12 tilts, the magnetic disk 14 also tilts simultaneously and therefore the interior space of the housing 12 does not change. As a result, stable rotation of the magnetic disk 14 is obtained and makes it possible to assure a stable head touch.

(3) Since the bearing 12 and the disk-mounting hub 15 are integrated with each other, the magnetic disk 14 can be prevented from touching the liners or sliding sheets during conveyance.

While the present invention has been described with reference to the preferred embodiments thereof, the invention is not to be limited to the details given herein, but may be modified within the scope of the invention hereinafter claimed.

What is claimed is:

1. A magnetic disk cartridge for use in a card disk drive to be loaded in electronic equipment, comprising:
   a housing;
   a disk-mounting hub which is rotated by a spindle provided in said disk drive; and
   a flexible magnetic disk mounted on said disk-mounting hub;
   wherein said disk-mounting hub is rotatably supported by said housing through a bearing equipped with inner and outer races which are mutually rotatable.

2. The magnetic disk cartridge as set forth in claim 1, wherein said outer race is fixed to said housing, and said inner race is fixed to said disk-mounting hub.

3. The magnetic disk cartridge as set forth in claim 1, wherein said inner race is fixed to said housing, and said outer race is fixed to said disk-mounting hub.

* * * * *